United States Patent [19]

Nadler

[11] Patent Number: 4,509,195
[45] Date of Patent: Apr. 2, 1985

[54] PROCESS AND DEVICE FOR THE BINARIZATION OF A PATTERN

[76] Inventor: Morton Nadler, 17 Les Huppes, 78170 La Celle Saint Cloud, France

[21] Appl. No.: 334,468

[22] Filed: Dec. 28, 1981

[30] Foreign Application Priority Data

Jan. 5, 1981 [GB] United Kingdom ............... 8100094

[51] Int. Cl.³ ........................ G06K 9/38; G06K 9/36
[52] U.S. Cl. ..................................... 382/51; 382/41; 358/284
[58] Field of Search ..................... 382/18, 41, 27, 51, 382/52, 56, 50; 358/282, 284

[56] References Cited

U.S. PATENT DOCUMENTS 3,605,093 9/1971 Parks et al. ........................... 382/50
3,973,239 8/1976 Kakumoto et al. .................. 382/50
4,123,778 10/1978 Graf et al. ............................ 382/51

FOREIGN PATENT DOCUMENTS 1419105 12/1975 United Kingdom .

Primary Examiner—John C. Martin
Assistant Examiner—Michael D. Parker
Attorney, Agent, or Firm—Bucknam and Archer

[57] ABSTRACT

The device of the invention allows the binarized evaluation of a pattern from a signal indicative of intensity values of spatially distributed discrete points of the pattern. It comprises circuits for registering the intensity values of points distributed in at least two concentric rings within an elementary area, at least in one sector centered on the elementary area, determining contrast values each equal to the difference of the registered intensity values between a point of an inner ring and a point of an outer ring, and assigning a positive and negative difference sign to respectively the positive and negative contrast values thus determined having an absolute value higher than a predetermined contrast threshold. A counter is provided for counting distinctively the positive and negative difference signs in the vicinity of the elementary area. An evaluation circuit assigns a light or dark quality to the area respectively when the counted difference signals contain a predominant number of positive or negative difference signs by more than a predetermined minimum.

10 Claims, 10 Drawing Figures

PROCESS AND DEVICE FOR THE BINARIZATION OF A PATTERN

The invention relates to a process and a device for the binarization of a pattern wherein successively scanned areas of the pattern are given a dark or bright quality from a signal indicative of the intensity values of spatially distributed discrete points of the pattern. Although reference is specially made here to patterns including contrasted areas differing by the light intensity, in a video signal, it should be understood that the expressions used are meant to cover any other kind of contrast between opposite qualities, such as black and white, colored and not colored, transparent and not transparent, conductive and not conductive.

One of the main requirements in certain pattern recognition devices, such as optical character readers (OCR), is the binarization of the images of the individual graphic symbols to be recognised. Ideally a printed or written symbol consists of a uniformly dark area on a uniformly bright background, the dark area representing the inked or otherwise laid down pattern of strokes comprising the form to be recognised. In actual fact, the majority of procedures for creating such documents do not result in such two uniformly bright and dark areas. Nevertheless, if the variations in darkness of the inked area and the variations in brightness of the background are small with respect to the difference in mean values of the inked areas and the background, a simple threshold operation will reliably binarize the image, where, for example, an area whose video value is less than the threshold (dark) will take the logical value 1, and an area with a video value greater than the threshold (light) will take the logical value 0, according to the usual but not limitative convention that the inked areas correspond to logical 1. The areas are composed of elementary sampled points, such as may be obtained by the use of an array of photodetectors, where the size of the elementary sampled area is chosen with respect to the smallest dimensions of objects of interest for the OCR system. This explains the requirement on the part of the majority of OCR equipment suppliers for very tight tolerances on the print contrast signal (PCS) of documents intended to be read by their equipment.

Attempts have been made to loosen the requirements on the quality of print by the use of more complex binarization systems than simple thresholds. Such attempts are sometimes based on the common characteristic of printed areas that they are locally always darker than the background; the human eye and brain succeed in recognising the shapes of printed symbols even in the most difficult circumstances by virtue of this property of local contrast. Up to now attempts to construct binarization circuits based on local contrast have been mainly based on either the gradient or the laplacean mathematical models. In the latter the integral video parameter, for example reflectance is measured in concentric rings, the values in the successive rings multiplied by a weight, and the products added algebraically; the sum of weights is taken to be zero, requiring that certain of the weights be positive and others negative. A simple and often cited form of laplacean uses a central disk with weight $+1$ and a concentric ring with weight $-1$. However this simple form cannot be used with practical scanners containing arrays of photodetectors, yielding a discrete raster. In this case the simplest equivalent operator, well known in the literature, is based on a $3 \times 3$ square of elementary sampled areas. The central sampled area is given the weight of $+8$, while each of the peripheral sampled areas, eight in number, is given the weight $-1$. Again the total weight is zero; such a scheme is called a finite-difference approximation to the laplacean operator. The video values sampled at each of the elementary areas is summed with the corresponding weight and the result compared to a negative threshold. If the result is positive, the value 0 is assigned to the central elementary area, if negative, then the value 1.

It can be seen that in the absence of contrast, i.e., when all of the nine samples have the same video value, or in the presence of a uniform contrast gradient over the area covered by the nine elementary sampled areas the result of this operation will be zero; on the other hand, when a contrast edge passes through the $3 \times 3$ set of elementary sampled areas the result will be 1 or 0, depending on the position of the central elementary area with respect to the contrast edge. A particular consequence of this is that darkened areas wider than one such $3 \times 3$ configurations, less one element, i.e., two elements wide, will have the interior hollowed out, i.e, set to 0. In general, the finite-difference approximation to the laplacean need not be limited to $3 \times 3$, but may have arbitrary numbers of elementary sampled areas in an approximately circular arrangement, as long as the weights are symmetrically arranged with respect ot the axes of symmetry and the central sampled area. If D is the diameter of such an operator, measured in the number of elementary sampled areas across this diameter, the maximum width of inked area that can be correctly detected without hollowing will always be $(D-1)$. The extent of the configuration must obviously be compatible with the widest object to be detected. On the other hand, if the shapes of small objects are to be faithfully reproduced, the size of the elementary sampled area must be smaller than the least dimension of such small objects. Therefore if the width of large objects is much greater than that of small objects the configuration must contain a large number of small elementary sampled areas. It will be obvious that the complexity of the finite-difference operator will increase in such cases, involving multiplication by perhaps non-binary-power weights and the algebraic summation of a large number of numerical values.

A further cause of difficulty with the laplacean is more fundamental and has up to now prevented its general use for solution of the binarization problem in OCR devices: it has a tendency to magnify slight accidental contrast variations, such as are due to microscopic defects in printing or lack of uniformity of background of the medium bearing the printing or writing, resulting in undue changes in the shapes of the boundaries of such objects after binarization, a phenomenon referred to in the art as "noise amplification".

Such prior art is described in British Patent Specification No. 1.419.105, wherein the calculation of the laplacean operator and the weights is detailed.

Accordingly, it is the object of the present invention to supply simple means for binarizing an image based on local contrasts, simpler than known systems, while avoiding the phenomenon of noise amplification. In particular, the invention will be simple enough to implement that extensive configurations will not require excessive material for their construction and implementation.

The present invention consists, for each elementary area in registering the intensity values of points distributed in at least two concentric rings within at least one sector centered on said elementary area, determining a number of contrast values each equal to the difference of registred intensity values between a point of an inner ring and a point of an outer ring, assigning a positive and negative difference sign to respectively the positive and negative contrast values showing an absolute value higher than a predetermined contrast threshold, counting separately said positive and negative difference signs, and assigning a light or dark quality to said area respectively when said counted signs contain a predominant number of positive or negative signs by more than a predetermined minimum.

The steps above are repeated for each successive elementary area of the pattern. In practice, the points the intensity values of which are used are selected from the elementary areas around the central one which is being evaluated, and they are regularly distributed with circular symmetry around the central point. The number of rings where they are located, at different radial distances from the central point, is most usually two or three, and the central point itself may be one such ring.

The invention will now be explained by means of the accompanying diagrams.

Figure 1:
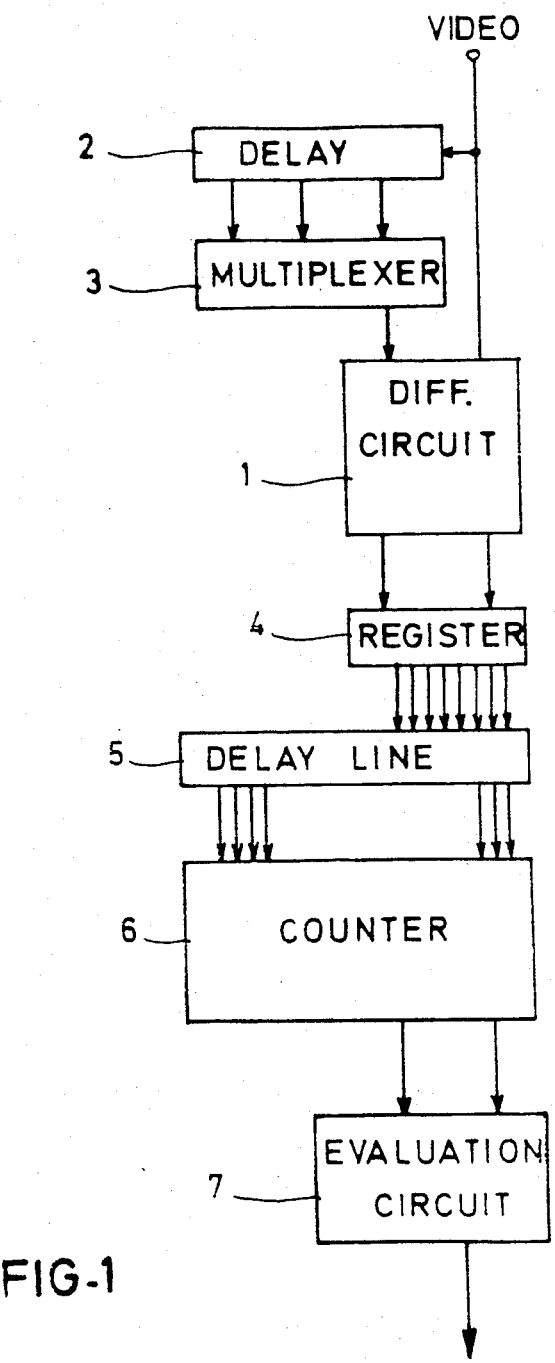
FIG. 1 is a block diagram, representing the principal modules of which one embodiment of the invention is composed.

It is assumed that the video input to the binarizer is obtained sequentially from a scanning head, where successive samples are digitised (converted to digital values) with a number of bits compatible with the signal quality and its signal/noise ratio. In FIG. 1 the current value of the digital video is applied to one input of a difference circuit 1 and to the input to a digital delay line 2 whose outputs are multiplexed to the other input of the difference circuit by a multiplexer 3. The various outputs of the difference circuit are assembled into a single word by the register 4 and input to a digital delay line 5. The digital delay line 5 has a large number of output positions, corresponding to individual bits of the input words, delayed by various amounts; all of these bits are input to the dual bit counting circuit 6, which counts separately the numbers of positive and negative differences that have been transmitted to it from the digital delay line 5. The two counts are applied to two inputs to the evaluation circuit 7, which assigns the value 0 or 1 to a certain elementary area, depending on whether the result of evaluation indicates that it is to be considered white or black.

The mode of operation will be understood more clearly by reference to FIGS. 2 and 3 showing scanned elementary areas constituting points around a central elementary area for evaluating the latter. FIG. 2 shows three sets of arrows in different configurations at (a), (b) and (c). The sets of arrows form symmetrical patterns about the x- and y-axes at 45 degrees, passing through the elementary sampled area 0, taken as origin, in (a) and (b), or the three axes at 120 degrees in (c). Each of these arrows corresponds to one pair of values whose difference is taken in the direction indicated by the arrow: the value at the arrowhead is subtracted from the value at the foot of the arrow. The device called difference circuit 1 on FIG. 1 carries out the following operations: for each arrow it takes the corresponding difference; the absolute value of the difference is compared to a threshold u; if the absolute value of the difference exceeds the threshold, the sign of the difference is encoded by two bits and input to a particular position of the register 4. In the general case the same elementary area may appear in two or more differences, depending on the configuration of arrows. It is understood that the arrows are here used only to represent graphically the positions of the elementary sampled areas whose differences are taken, two-by-two. It is also understood that the configurations shown in FIG. 2 are for purposes of illustration only, and that other configurations may be found to be advantageous in particular cases.

Figure 2B:
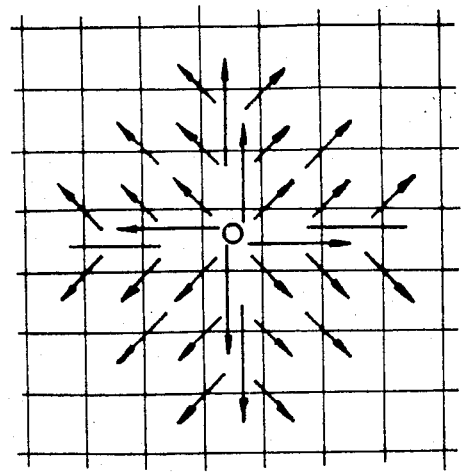
FIGS. 2a–2c show two possible arrangements of local differences for a rectangular raster and one possible arrangement for a hexagonal raster.
Figure 2C:
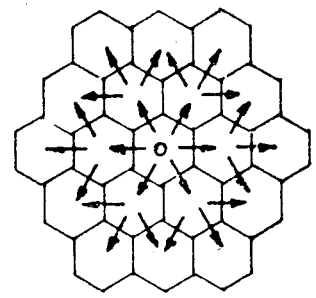
Figure 2A:
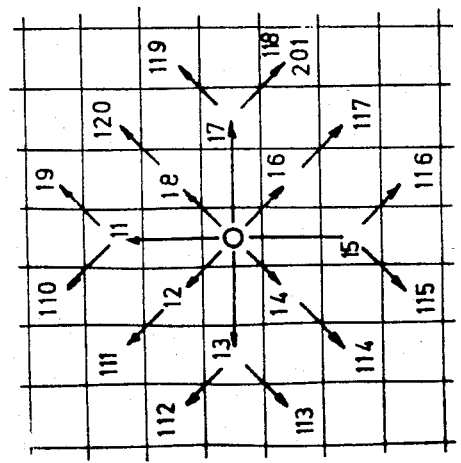
Figure 4B:
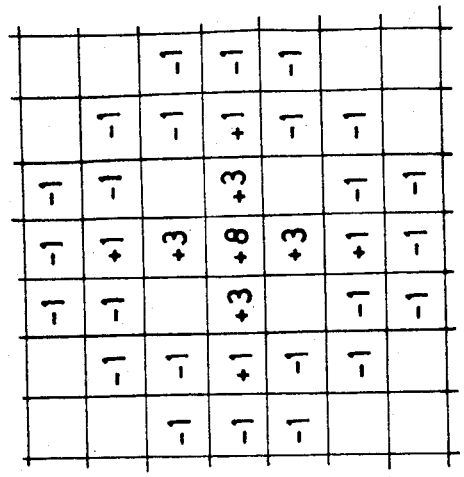
FIGS. 4a–4c show the arrangements of "weights" corresponding in a certain sense to the arrangements of FIG. 2.
Figure 4A:
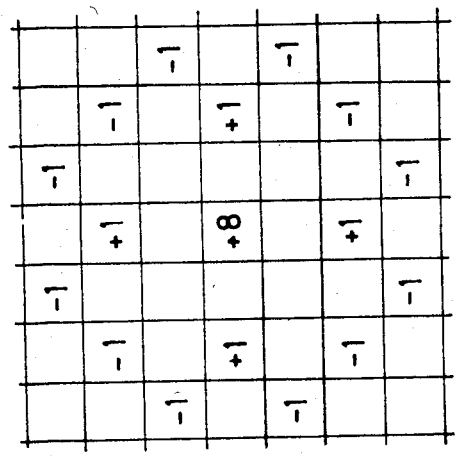
Figure 4C:
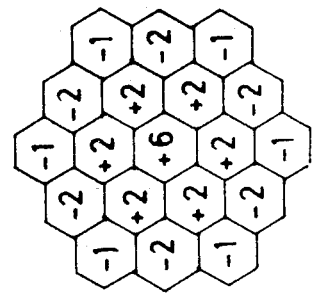
Figure 3A:
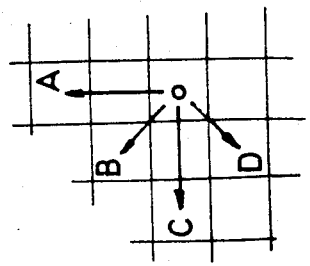
FIGS. 3a and 3b show the minimum sets of local differences required for the arrangements of FIG. 2.
Figure 3B:
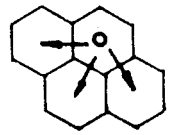

An attentive examination of FIG. 2 shows that there are only four typical arrows in (a) and (b), which appear at the various positions of the two configurations, in half of the positions with the sense reversed: these four typical arrows are shown in FIG. 3(a). Similarly, there are only three typical arrows in FIG. 2(c), shown in FIG. 3(b). To reduce the number of differences that have to be computed, the difference circuit 1 only computes the typical differences shown in FIG. 3. It can be seen that while the configuration of FIG. 2(a) involves 20 differences (20 arrows), the circuit of FIG. 2(b) has 32; nevertheless the number of differences that are actually computed is the same in either case: four. It can also be appreciated that for hexagonal arrays more extensive configurations can be designed than the one shown at FIG. 2(c); to the extent that such configurations had differences used only between adjacent elementary sampled areas the three typical differences of FIG. 3(b) would be sufficient for any of them. In the following discussion of the operation of the device according to the invention we shall consider only the configuration of FIG. 2(a), but the principles enunciated are perfectly general and their application to any arbitrary different configuration will be obvious.

The difference module must compute four differences:

$$\Delta A = V(0) - V(A)$$

$$\Delta B = V(0) - V(B)$$

$$\Delta C = V(0) - V(C)$$

$$\Delta D = V(0) - V(D)$$

where V (X) represents the video value at the position X. This can be done by a single adder-subtractor module to which the value V (0) is applied constantly to the first input, and the values V (A), V (B), V (C), V (D) are applied successively to the other (subtracting) input from a shift register delay line 2 over the multiplexer 3. If we use the notation V (i,j) to represent the various values V (X), where i,j are the row and column coordinates of the position X, we can rewrite (1) in the following form, where we take the position of 0 as i,j and the other positions are labelled by their offsets from that position:

$$\Delta A = V(i,j) - V(i-2,j)$$

$$\Delta B = V(i,j) - V(i-1, j-1)$$

$$\Delta C = V(i,j) - V(i, j-2)$$

$$\Delta D = V(i,j) - V(i+1, j-1) \qquad (2)$$

Each of these differences is put into the form of absolute value and sign; if the absolute value exceeds the threshold u, the sign is output to a particular position in the output register 4 which can take the convenient form of a parallel-in-parallel-out-serial-shift register. The value of u is to be selected exclusively from considerations of signal/noise ratio. When the video signal has been digitised to six bits, for example, and it is known that the errors and variations of print contrast do not exceed, say 10% of maximum brightness to be observed, u can usefully be set to $\frac{1}{8}$ of full scale, i.e;, 7 or 8. It will be appreciated that this value is given for sake of illustration only, and that the concrete value to be selected in each case will depend on the details of the design and application.

Figure 5:
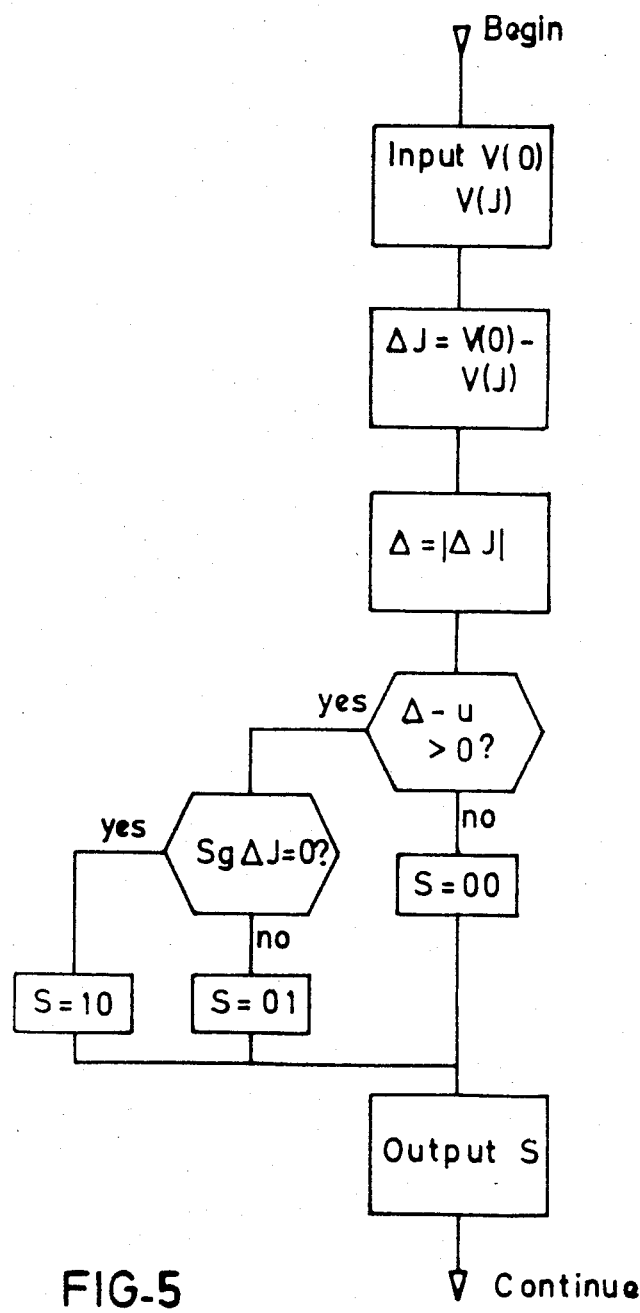
FIG. 5 gives the flowchart of one detail of the computation required for the implementation of the invention by a bit-slice arithmetic unit.

After each sign is input to the register, it is shifted, so that the output from the difference circuit can be connected to fixed positions. Since it is required to encode three values: +, −, and 0 for below threshold differences, we require two bits for each code. Then one of the bits can represent +(s=10) and the other one −(s=01); the absence of a 1 in positions, i.e. the code s=00, will represent the below-threshold differences. Then a standard integrated circuit register of 8 positions will exactly hold the standard difference signs for the position i,j. These 8 bits, called a byte, are input after each cycle of computation of the signs for a given position i,j to the byte-wide shift register delay line 5 for further use. The above operations are easily implemented by a bit-slice arithmetic unit containing the operations of absolute value and comparison (such as the well known 2900 series). FIG. 5 represents the flowchart of the microprogram to be executed by such a device.

The next operation is to count the + and − difference signs corresponding to the full configuration represented in FIG. 2(a). Assume that the scan proceeds by columns, the columns succeeding each other from left to right, in the well known manner for generating OCR rasters. Consider the set of differences indicated by the arrows of FIG. 2(a). The arrows 11, 12, 13, 14 correspond to the standard configuration of FIG. 3(a). However we cannot use them at the time that elementary area 0 is being computed by the difference circuit 1, since the differences corresponding to arrows 15 through 19 and 116 through 120 have not yet been computed, as the corresponding elementary sampled areas have not yet been scanned. The earliest time at which all the required differences for the elementary area 0 are available is when the area labelled 201 has arrived. Let us call this elementary area I,J. Then the pattern of difference signs to compute the binary value at elementary area 0, i.e., I−1, J−3, will be given by the following set of expressions, where the numbers to the left of the equality signs refer to the labelled arrows in FIG. 2(a) and the symbols s, s̄ mean the sign and the sign reversed, respectively:

| | | |
|---|---|---|
| sl1 = sA (I − 1, J − 3) | sl11 = sB (I − 2, J − 4) | (3) |
| sl2 = sB (I − 1, J − 3) | sl12 = sB (I − 1, J − 5) | |
| sl3 = sC (I − 1, J − 3) | sl13 = s̄$_D$(I − 1, J − 5) | |
| sl4 = sD (I − 1, J − 3) | sl14 = s$_D$(I, J − 4) | |
| sl5 = sA (I + 1, J − 3) | sl15 = s$_D$(I + 1, J − 3) | |
| sl6 = sB (I, J − 2) | sl16 = s$_B$(I + 2, J − 2) | |
| sl7 = sC (I − 1, J − 1) | sl17 = s$_B$(I + 1, J − 1) | |
| sl8 = sD (I − 2, J − 2) | sl18 = s$_B$(I, J) | |
| sl9 = sD (I − 4, J − 2) | sl19 = s$_D$(I − 2, J) | |
| sl10 = sB (I − 3, J − 3) | sl20 = s$_D$(I − 3, J − 1) | |

Thus, the total number of difference signs is 20, each with the value + or −. Assigning a unit value to each sign, the twenty signs can be obtained at various outputs along the digital delay line 5 and applied to the positive and negative inputs, respectively, of two circuits for counting the number of each kind, in the bit-counting circuit 6. The sign inversion s̄ is easily obtained by wiring the +1 bit to the −1 input to the counter and vice versa. It is thus clear that the difference signs determined and registered for each sector of a given elementary area are also used when analysing other surrounding elementary areas scanned at different times, where they are used as determining the difference signs of similar or symmetrical sectors of such other areas.

In the circuit for FIG. 2(a) there are 20 difference signs to be counted of each polarity, in the circuit for FIG. 2(b) 32, and in the circuit for FIG. 2(c) 24. In general the number of difference signs to be counted will then be an arbitrary number that depends on the configuration of differences selected for the binarizer.

A number of embodiments are available to the designer, where the choice will depend on factors such as: speed required, cost of devices as a function of the number of units that are expected to be manufactured, reliability, etc . . . . An example of convenient circuits is described thereinafter.

The difference signs can be put into two shift registers, whose length are equal to the total number of differences in the configuration; they are then shifted out rapidly to the inputs to two binary counter circuits. At the completion of the operation each counter will contain the numbers of bits equal to 1 that were applied to the inputs. This operation uses a constant amount of hardware (except for the length of shift register, and this can be multiplexed), but the circuit speeds required obviously increase as the number of differences increases—the entire operation must be completed within the time of one sampling operation of the photodetector array.

A combinational circuit can be designed, using either standard logic modules or custom designed circuits if quantities justify, that produce the required result by parallel logic; the number of inputs is equal to the number of differences to be counted. Such a design is extremely fast, but its complexity increases approximately as the square of the number of inputs.

A third solution would be to multiplex the difference signs into a certain number of words of a fixed number of bits, the length of word being chosen with respect to economical read-only memory modules (ROM); the output words from the ROM can obviously be the binary number corresponding to the number of bits equal to 1 in each possible input word; the output binary numbers are added in an accumulator. This design is intermediate in speed between the counter and the combinational circuits described above, and has a fixed volume of material, regardless of the number of difference signs to be counted.

Other solutions may suggest themselves to the designer, depending on available technology. The final result of the bit counting operations is two binary numbers, $\Sigma(+)$, $\Sigma(-)$, representing respectively the numbers of positive and negative differences that have exceeded the threshold u. The final step in the binarization is the decision concerning the binary value (0 or 1) to be assigned to the elementary area 0. This may be effected in various ways. For example, the two binary numbers $\Sigma(+)$ and $\Sigma(-)$ can be concatenated and used as the address to a ROM containing a 1-bit table corresponding to the decision 1 or 0 to be taken for each possible pair of counts. This design will allow an arbitrary experimental relation between the counts and the final evaluation. An alternative solution, but which has less flexibility, is to use numerical comperators to compare the number of positive to the number of negative difference signs to determine the difference between these numbers, to compare said difference to a fixed minimum, and to output the dark or light sign for the area if the difference between the numbers is higher than the minimum and depending on which of the positive or negative difference signs has the higher number. Another way to use such numerical comparators is to compare the number of positive to the number of negative signs, and depending on which is higher, to compare then the number of positive or negative signs to a fixed minimum k. For example, if there is a predominant number of negative difference signs, we will have the following relations:

$$\Sigma(-) \geqq \Sigma(+)$$

$$\Sigma(-) \geqq k \quad (4)$$

which have the effect of requiring that the area 0 be confirmed by no less than k differences indicating that 0 is darker than its environment, on the one hand, and that the number of differences indicating that it is darker be at least equal to the number indicating that it is lighter. Other, more complex laws may suggest themselves to the designer; however, complexity is generally a drawback and the ROM design first suggested above is usually preferred. Using the simple decision function (4) above, the value of k is chosen from considerations of a minimum dimension expected of the observed configuration. A value of 3 has been used with success in experiments.

Referring now to FIGS. 2a through 4c, we find arrangements of intergers obtained in the following way: in a given configuration of elementary differences as represented in FIG. 2 a "weight" of +1 is assigned to each foot of an arrow, i.e., if the video value of the corresponding elementary sampled area enters with sign positive into the elementary difference, and a weight of −1 for each arrowhead, i.e., if it enters negatively. It is easily seen that if instead of accumulating the signs of the differences for those differences that exceed the threshold u the actual values of video in the set of elementary sampled areas were summed algebraically with the weights shown in the corresponding parts of FIG. 4 we would obtain a finite-difference calculation of the laplacean operator. The use of the difference sign instead of the actual video value constitutes one source of economy and simplicity of the present binarizer as compared with the laplacean operator. The configurations indicated here occupy much larger areas in terms of the number of elementary sampled areas than are usually used in the finite-difference laplacean, which would render the exact computation exceedingly complex as compared with the present invention. However the difference between the laplacean operator as such and the present device is more fundamental. Effectively, the use of the threshold u suppresses certain sources of disturbance that are magnified by the true laplacean operator, rendering the use of the latter impractical for the type of binarizer here considered. This consideration will serve as the guide for the choice of the value of the threshold u. It should be just large enough to suppress the effects of random variations of the scanned medium on the detection of the difference signs; the difference signs that pass the threshold u should correspond to true contrast differences, however slight, but not to accidental differences ("noise") within the background or within the inked area. The best value of u would be one that suppressed the majority of noise differences, but not all, as the difference counting and decision process will also play a role in suppressing isolated noise differences.

The choice of configuration is defined by the desired quality vs. cost considerations. It is obvious that the configuration of FIG. 2(b) will supply a better result than that of FIG. 2(a) inasmuch as it takes into account a larger number of differences over the same area. It is also the case that the closer the equivalent "weight" distribution comes to that of a well designed laplacean over a given area the better will be the quality; the zero "weights" in FIG. 2(a) disturb the equivalence to laplacean. From these considerations, it will be clear that the choice of size of elementary sampled area and of extent of the difference configuration will be governed by the same considerations as for the laplacean, as discussed above. In particular, the device according to the invention can be designed by consideration of the laplacean operator that would be suitable for a given application; from the distribution of weights in the finite-difference laplacean the configuration of differences can be found; the details of the design process will be evident to the specialist from the above description of the functioning of the system.

I claim:

1. A process for binarization of a signal indicative of intensity values of spatially distributed discrete points of a pattern wherein each of successively scanned elementary areas is evaluated as being of dark or bright quality depending on the intensity values of a number of points around said elementary area, wherein said process comprises, for each said elementary area:

registering the intensity values of points distributed in at least two concentric rings within at least one sector centered on said elementary area, determining a number of contrast values each equal to the difference of registered intensity values between a point of an inner ring and a point of an outer ring, assigning a positive and negative difference sign to respectively the positive and negative contrast values showing an absolute value higher than a predetermined contrast threshold, counting separately said positive and negative difference signs, and assigning a light or dark quality to said area respectively when said counted signs contain a predominant number of positive or negative signs conforming to a predetermined minimum condition.

2. A process according to claim 1, wherein each point is involved in the calculation of contrast values by difference with points of an inner ring or outer ring a predetermined number of times individually selected for each point, with circular symmetry.

3. A process according to claim 1, wherein it comprises registering the positive and negative difference signs counted for said sector and using the registered signs as an indication of the positive and negative difference signs in a similar or symmetrical sector centered on another later scanned elementary area.

4. A process according to claim 3, wherein it comprises determining the difference in number between said counted registered positive difference signs and said counted registered negative difference signs for all sectors around said elementary area, comparing said difference in number to a predetermined minimum and assigning the light or dark quality only if said difference in number is higher than said minimum, the quality being light or dark when the number of positive signs is respectively higher or lower than the number of negative signs.

5. A device for the binarized evaluation of a pattern from a signal indicative of intensity values of spatially distributed discrete points of said pattern, wherein said device comprises:
  means for registering the intensity values of points distributed in at least two concentric rings around each elementary area of successively scanned elementary areas, at least in one sector centered on said elementary area, determining contrast values each equal to the difference of the registered intensity values between a point of an inner ring and a point of an outer ring, and assigning a positive and negative difference sign to respectively the positive and negative contrast values thus determined having an absolute value higher than a predetermined contrast threshold,
  means for counting distinctively said positive and negative difference signs in the vicinity of said elementary area and means for assigning a light or dark quality to said elementary area respectively when said counted difference signs contain a predominant number of positive or negative difference signs comforming to a predetermined minimum condition.

6. A process according to claim 3, further comprising comparing the number of said positive difference signs and the number of said negative difference signs for all sectors around said elementary area, determining from said comparison which of said positive or negative signs has the higher number, comparing said higher number to a predetermined minimum, and assigning the light or dark quality only if said higher number is higher than said minimum, the quality being light or dark depending on the difference sign corresponding to said higher number.

7. A device according to claim 5, further comprising means for involving each point in the calculation of contrast values by difference with points of an inner ring or outer ring a predetermined number of times individually selected for each point, with circular symmetry.

8. A device according to claim 5, further comprising means for registering the positive and negative difference signs counted for said sector and using the registered signs as an indication of the positive and negative difference signs in the similar or symmetrical sector centered on another later scanned elementary area.

9. A device according to claim 8, further comprising means for determining the difference in number between said counted registered positive difference sign and said counted registered negative difference signs for all sectors around said elementary area, comparing said difference in number to a predetermined minimum and assigning light or dark quality only if said difference in number is higher than said minimum, the quality being light or dark when the number of positive signs is respectively higher or lower than the number of negative signs.

10. A device according to claim 8, further comprising means for comparing the number of said positive difference signs and the number of said difference signs for all sectors around said elementary area, determining from said comparison which of said positive or negative signs have the higher number, comparing said higher number to a predetermined minimum, and assigning the light or dark quality only if said higher number is higher than said minimum, the quality being light or dark depending on the difference sign corresponding to said higher number.

* * * * *